Jan. 5, 1926.

H. E. WARREN

DEMAND RECORDER

Filed March 21, 1924

Inventor:
Henry E. Warren,
by *Alexander S. Lamb*
His Attorney.

Patented Jan. 5, 1926.

1,568,704

UNITED STATES PATENT OFFICE.

HENRY E. WARREN, OF ASHLAND, MASSACHUSETTS, ASSIGNOR TO GENERAL ELECTRIC COMPANY, A CORPORATION OF NEW YORK.

DEMAND RECORDER.

Application filed March 21, 1924. Serial No. 700,943.

*To all whom it may concern:*

Be it known that I, HENRY E. WARREN, a citizen of the United States, residing at Ashland, in the county of Middlesex, State of Massachusetts, have invented certain new and useful Improvements in Demand Recorders, of which the following is a specification.

My invention relates to graphic demand recorders and the object of my invention is to provide a simple, inexpensive, yet highly reliable apparatus of this class.

In my application, Serial No. 700,947, entitled "Demand recorder," filed concurrently herewith and assigned to the same assignee as the present application, I have described a demand recorder wherein a recording device is arranged to be driven in a continuous path adjacent to and transversely to a moving record sheet at a speed proportional to the demand to be recorded and wherein the recording device is provided with fixed styli or other marking means which are thus caused to move across the record sheet and normally out of contact therewith. When a stylus is in a predetermined position with respect to the record sheet and moving toward it a timing interval is started and at the end of the interval the stylus and record sheet are brought into contact to establish a record, which is a measure of the distance moved by the styli during the interval. As soon as another stylus comes into the starting position another timing interval is started and in this way a record of the demand at very frequent intervals is obtained.

The invention of the present application makes use of the continuously moving recording member moving transversely to a record sheet; but the marking means instead of being fixed on the moving member are established thereon at a fixed point with respect to the record sheet at the beginning of each time interval so that a continuous demand record is obtained. This feature enables me to deposit a marker on the moving recording device at the same instant that the position of a previously deposited marker is recorded on the record sheet. The record obtained is continuous and the apparatus for carrying out the invention embodies only a small number of simple parts.

The features of my invention which I believe to be novel and patentable will be pointed out in the claims appended hereto. For a better understanding of my invention reference is made in the following description to the accompanying drawing wherein Fig. 1 shows a perspective view of a preferred embodiment of my invention and Fig. 2 a portion of a record sheet showing the type of record obtainable.

Figure 1:
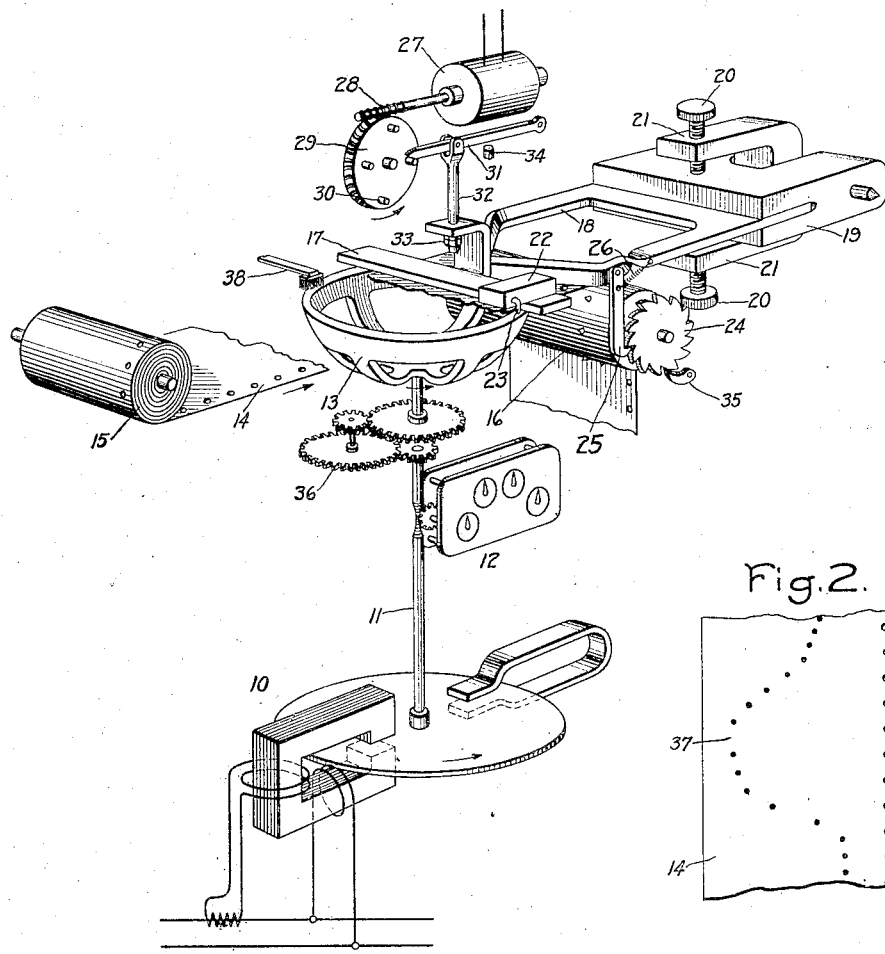

Referring now to Fig. 1, I have represented at 10 a watthour meter provided with the usual spindle 11 and registering train represented at 12. A cup shaped recording member 13, which is preferably in skeleton form to insure lightness and rigidity, is driven from the upper end of the shaft. Preferably reduction gearing 36 is provided to reduce the rotative speed of this cup.

The upper rim of the cup is substantially flat as represented. Adjacent thereto and normally out of contact therewith is a record sheet 14 which is represented as broken away to better expose the parts. The record sheet is arranged to be passed across a diameter of the cup and parallel thereto from a supply roll 15 over a feeding drum 16. Just above the record sheet over the cup is a platen 17 supported on the extremity of a spring member 18. The opposite end of the spring member is secured in a support 19 hinged for adjustment and secured in fixed adjustment by bolts 20 in the stationary clamp 21. Thus by means of the bolts 20 the normal position of the platen 17 with respect to the record sheet 14 may be adjusted. The normal position is such that the platen is just out of contact with the record sheet. The platen carries an ink container 22 having a dropper 23 normally positioned just above the rim of the cup 13 and just outside the near edge of the record sheet. The feeding drum is provided with a ratchet wheel 24 which cooperates with a pawl 25 pivoted to the spring member 18 and held in contact with the ratchet wheel by a light spring 26.

Means are provided for raising this platen and permitting it to drop at predetermined intervals in such a manner that when it is raised the record sheet 14 is advanced a short distance by the pawl 25, ratchet wheel 24 and drum 16 and when the platen drops it presses the record sheet lightly against the cup 13 and brings the ink dropper 23 very close to the rim of the cup so that the dropper will deposit a small drop of ink on the rim. Any suitable type of clock motor or clock controlled motor may be used for this purpose and I have represented a constant speed electric motor 27 in the present instance. The motor 27 may be of the self-starting synchronous type such as is described in my patent, 1,456,082. The motor drives through a worm 28, a wheel 29 having one or more axially projecting pins 30 therein. These pins cooperate with the end of a pivoted lever 31 so as to raise said lever a short distance and permit it to drop as each pin clears the end of the lever. The lever is secured to the platen 18 by a rod 32. Preferably the rod is adjustable with respect to the platen as by lock nuts 33 so as to obtain just the correct amount of movement of the platen for the purpose intended. A stop pin 34 is preferably provided to limit the downward movement of lever 31.

The operation of the device may be explained as follows: The direction of movement of the meter, cup 13, the wheel 29 and the record sheet 14 is indicated by arrows. Let us assume the wheel 29 makes one revolution per hour which will cause the platen to be raised and lowered every 15 minutes. Normally the platen, record sheet and revolving cup 13 are slightly separated. When the platen is raised by the motor 27 the record sheet 14 is advanced a short distance and the spring arms 18 are flexed slightly. When the lever 34 is released the spring member quickly moves the platen against the record sheet and carries it down against the cup. This position flexes the spring in the opposite direction so that the platen is immediately returned to a normal position and therefore does not interfere with the meter rotation. The adjustment should be such that the record sheet is caused to positively but lightly tap the revolving cup. This movement causes the ratchet 25 to slip over one tooth in the wheel 24 while the drum 16 is held from backward rotation by the spring pressed pawl 35. The ink dropper 23 deposits a small drop of ink on the rim of the cup just before it passes under the record sheet. The drop of ink which was thus deposited 15 minutes before and which has been carried under the record sheet a distance proportional to the average meter speed during the last 15 minute interval is transferred to the underside of the record sheet. When the spring member 18 comes back to normal position the ratchet 25 rotates the drum 16 slightly and takes up any slack in the record sheet so that it clears the cup and allows the same to revolve freely. The record sheet should be of such a quality that it will take up or absorb all the ink thus deposited without any appreciable spreading. The ink used should be of such a quality that it will not dry up to any appreciable extent during the time interval used.

Figure 2:
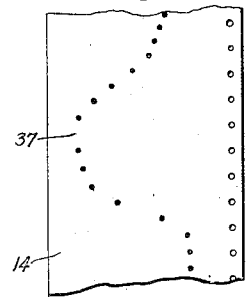

The nature of the record obtained by such an instrument is represented in Fig. 2 and the record sheet may be graduated and the time printed thereon if desired so that the demand for any interval may be immediately ascertained by inspection. Should the demand during any interval exceed the range of the instrument such that the ink drop on the rim is carried beyond the record sheet during the time interval it will be indicated by its absence from the record sheet as at 37. To prevent such an ink drop from being carried around a second time and thus producing a false record, an ink absorbing brush such as shown at 38 may be provided adjacent the rim of the cup to catch the ink. This brush, if used, should be positioned just out of contact with the rim or made to very lightly touch the rim so as not to produce any appreciable friction.

It will be evident that the demand interval may be made anything desired by changing the spacing of the pegs in wheel 29 or by changing the gear ratio at 28 or by changing the speed of motor 27. It will also be evident that the relative speed of cup 13 and the meter shaft 11 may be made anything desired by changing the gear ratio at 36, and if desired the cup may be mounted directly on shaft 11 so as to rotate at the same speed as the meter. In the latter case the time interval would be made very small and the record obtained would approach that corresponding to the instantaneous variations of the quantity measured. It will generally be preferable to provide gearing as at 36, because this connection prevents any jar incident to the recording operation from being transmitted to the meter shaft and bearings.

While I have described but a single modification of my invention I do not wish to be limited thereto, since other modifications and arrangement of the parts embodying the same general principles heretofore described will occur to those skilled in the art.

What I claim as new and desire to secure by Letters Patent of the United States, is:—

1. A demand recorder comprising a member arranged to be moved in a continuous path at a speed proportional to the demand to be recorded, a record sheet, means for moving the record sheet adjacent to and across the path of movement of said member, means for establishing a reference point on said member at a definite position with respect to said record sheet, and means for recording the position of said reference point on the adjacent portion of said record sheet after the elapse of a predetermined time interval.

2. A demand recorder comprising a member arranged to be moved in a continuous path at a speed proportional to the demand to be recorded, a record sheet arranged to be moved across said path and adjacent to said member, means for periodically establishing reference points on said member at a definite position with respect to the record sheet, and means for successively recording on the record sheet the positions of such reference points with respect to the record sheet at equal intervals of time after such points have been established.

3. A demand recorder comprising a member arranged to be moved in a circular path at a speed proportional to the demand to be recorded, a record sheet arranged to be moved across a diameter of said circular path and adjacent to said member, said circular path being of a greater diameter than the width of said record sheet, a device for depositing a marker on said member at a definite point as it approaches the record sheet, and means for transferring said marker to the adjacent portion of said record sheet after a predetermined interval to make a record of the extent of movement of said member during such interval.

4. A demand recorder comprising a member arranged to be moved in a continuous path at a speed proportional to the demand to be recorded, a platen adjacent to and slightly separated from said member, a record sheet arranged to be passed between said platen and member in a direction transversely to the movement of said member, means for establishing a marker on said member at a definite position with respect to the record sheet, and a timing device for periodically causing the platen to press the record sheet against the moving member and simultaneously actuating said marker establishing means.

5. A demand recorder comprising a record sheet, a member arranged to be moved in a circular path in a plane adjacent to said record sheet at a speed proportional to the demand to be recorded, said circular path being of greater diameter than the width of said record sheet, a platen on the opposite side of said record sheet from said member, an ink dropper arranged adjacent to said member at one side of said record sheet, means for advancing said record sheet, and means for periodically pressing said platen against said record sheet and simultaneously causing said ink dropper to deposit a spot of ink on said member.

6. A demand recorder comprising a record sheet, a member arranged to be co-tated in a circular path in a plane adjacent to and parallel to a portion of said record sheet at a speed proportional to the demand to be recorded, a resiliently supported platen on the opposite side of said record sheet from said member adjacent the said portion of said record sheet, a container on said platen, a marking fluid in said container, a fluid dropper extending from said container to a point adjacent said member at one side of said record sheet, and time controlled means for periodically vibrating said platen away from and towards said record sheet, and means actuated by the movement of said platen away from said record sheet for advancing the latter.

7. A demand recorder comprising a record sheet, a member arranged to be driven in one direction across the face of said record sheet and shaped so as to present a continuously changing substantially flat surface to said record sheet, means for depositing a marker on said surface at predetermined time intervals and at a definite position with respect to the record sheet, said member being driven at a speed proportional to the demand to be recorded, and means for momentarily establishing contact between said record sheet and surface at predetermined time intervals for the purpose of depositing such markers onto said record sheet.

8. A demand recording device comprising a member having a continuous surface such as the rim of a cup, a record sheet arranged to be advanced adjacent to a portion of said surface, means for moving said surface in one direction transversely to said record sheet at a speed proportional to the demand to be recorded, means for depositing a marking fluid on said surface at a definite position with respect to the record sheet and at predetermined time intervals, and means actuated simultaneously with said fluid depositing means for establishing contact between said record sheet and the adjacent portion of said surface.

9. In an integrating type meter, a recording member having a circular band driven from said meter through reduction gearing, a record sheet of less width than the diameter of said band arranged to be advanced in a radial direction adjacent to one periphery of said band, a platen for momentarily pressing said record sheet against said band, an inking device carried by said platen, and a device for intermittently actuating said platen, said inking device being so positioned that it deposits a small drop of ink on said band as it approaches the record sheet when said platen is actuated.

10. In an integrating type meter, means for measuring and recording the demands of said meter over equal time intervals comprising a recording member driven in a circular path by said meter, a record sheet arranged to be moved adjacent to said member and transversely to a portion of its circular path, means for periodically depositing markers on said member at a definite position with respect to the record sheet, and means for transferring such marker to the adjacent portion of said record sheet at predetermined time intervals thereafter.

11. A demand recorder comprising a member having a continuous surface, such as the rim of a cup, means for driving said surface in a continuous path at a speed proportional to the demand to be recorded, a record sheet arranged to be moved adjacent to and transversely to one portion of said path such that the surface continuously moves across the face of said record sheet, means for measuring the length of said surface which passes said record sheet during each of successive predetermined time intervals and means for successively recording said measurements on said record sheet.

In witness whereof, I have hereunto set my hand this 17th day of March, 1924.

HENRY E. WARREN.